(12) United States Patent
Akino

(10) Patent No.: US 9,538,273 B2
(45) Date of Patent: Jan. 3, 2017

(54) MICROPHONE DEVICE INCLUDING LIGHT EMITTING ELEMENTS

(71) Applicant: KABUSHIKI KAISHA AUDIO-TECHNICA, Machida-shi, Tokyo (JP)

(72) Inventor: Hiroshi Akino, Machida (JP)

(73) Assignee: KABUSHIKI KAISHA AUDIO-TECHNICA, Machida-Shi, Tokyo (JP)

( * ) Notice: Subject to any disclaimer, the term of this patent is extended or adjusted under 35 U.S.C. 154(b) by 0 days.

(21) Appl. No.: 15/009,189

(22) Filed: Jan. 28, 2016

(65) Prior Publication Data

US 2016/0249121 A1 Aug. 25, 2016

(30) Foreign Application Priority Data

Feb. 24, 2015 (JP) .................. 2015-033459

(51) Int. Cl.
*H04R 1/02* (2006.01)
*H04R 19/04* (2006.01)
*H04R 1/32* (2006.01)

(52) U.S. Cl.
CPC .............. *H04R 1/028* (2013.01); *H04R 1/326* (2013.01); *H04R 19/04* (2013.01)

(58) Field of Classification Search
None
See application file for complete search history.

(56) References Cited

U.S. PATENT DOCUMENTS

| | | | | |
|---|---|---|---|---|
| 4,528,690 A | * | 7/1985 | Sedgwick | A61B 7/04 381/67 |
| 4,567,608 A | * | 1/1986 | Watson | H04R 1/08 381/111 |
| 2002/0186855 A1 | * | 12/2002 | Akino | H04R 3/00 381/111 |
| 2007/0230717 A1 | * | 10/2007 | Akino | H04R 3/00 381/113 |

FOREIGN PATENT DOCUMENTS

JP 4528465 B2 8/2010

* cited by examiner

*Primary Examiner* — Paul Huber
(74) *Attorney, Agent, or Firm* — Manabu Kanesaka

(57) ABSTRACT

A microphone device includes an audio signal output circuit that balanced-outputs, through a balanced transmission line, an audio signal output from a condenser microphone unit, a balanced output terminal including a hot terminal, a cold terminal, and a ground terminal connected to the balanced transmission line, a power supply circuit that supplies a phantom power supply to the audio output circuit from the balanced output terminal through the balanced transmission line, and a display circuit including light emitting elements that perform lighting and non-lighting according to an operation of a manual switch, and the display circuit includes constant current elements that generate a constant current through the balanced transmission line, a constant voltage element connected to the constant current elements and which generates a constant voltage, and light emitting elements connected to the constant current elements, and to which the constant voltage by the constant voltage element is applied.

6 Claims, 3 Drawing Sheets

MICROPHONE DEVICE INCLUDING LIGHT EMITTING ELEMENTS

RELATED APPLICATIONS

The present application is based on, and claims priority from, Japanese Application No. JP2015-033459 filed Feb. 24, 2015, the disclosure of which is hereby incorporated by reference herein in its entirety.

BACKGROUND OF THE INVENTION

Field of the Invention

The present invention relates to a microphone device favorably used in conference rooms and the like, and especially relates to a microphone device including light emitting elements, which can suppress occurrence of noises based on switching of lighting and non-lighting of the light emitting elements included in the microphone.

Description of the Related Art

For example, as conference microphones installed on speech tables of conference rooms or tables of conference attendees, gooseneck-type microphones are provided. The gooseneck-type microphones include a stand arm with a long neck and including a flexible pipe that easily enables angle or height adjustment, and a microphone case in which a microphone unit is housed is attached to a tip portion of the stand arm.

As the gooseneck-type microphones, typically, a small and light condenser microphone is used, and a phantom power feed system is employed in order to operate an impedance converter of the condenser microphone, the phantom power feed system being able to obtain an operation power supply from a microphone amplifier unit side, such as a mixer, using a signal line of the microphone.

In the above-described microphones installed in conference rooms or the like, a microphone including a light emitting element therein is provided in order to have smooth progress of conferences, and a light bulb or an LED is used as the light emitting element.

Currently, in many of these types of microphones, LED which consumes little power and has good visibility is used as the light emitting element.

FIG. 1 illustrates an example of a gooseneck-type microphone including light emitting elements. A gooseneck-type microphone 1 illustrated in FIG. 1 is configured from a base portion 2 detachably mounted to a socket attached on a conference desk or a desk surface, a stand arm 3 attached to the base portion 2, and a microphone case 4 attached to an upper end portion of the stand arm 3.

The stand arm 3 is configured from a center relay pipe 3a, and flexible pipes 3b and 3c attached to upper and lower both ends of the relay pipe 3a.

Further, a condenser microphone unit and an audio signal output circuit including an impedance conversion circuit described below are housed in the microphone case 4 attached to the upper end portion of the stand arm 3. Further, a plurality of light transmission holes 4a is formed along a peripheral side surface of the microphone case 4, and the light transmission hole 4a is embedded with a translucent resin material. Light from LEDs (not illustrated) as the light emitting elements housed in the microphone case 4 is projected to an outside through the translucent resin material of the light transmission holes 4a.

The LEDs as the light emitting elements mounted on the gooseneck-type microphone 1 is subjected to lighting (light emission) and non-lighting operations by remote control by a chairman of a conference or an operator who can overlook the entire conference room. Accordingly, the chairman can prompt a speaker with a lighted light emitting element to speak, and can smoothly advance the conference.

By the way, as a power supply that lights the LEDs as the light emitting elements mounted on each microphone, two means can be considered, which include means to supply a power supply independent of an outside, and means to use a power supply to be supplied to the audio output circuit of the microphone.

When the latter means to use a power supply to be supplied to the microphone is used, there are advantages that only a control signal line that controls lighting and non-lighting of the light emitting elements may just be wired, and it is not necessary to separately supply a current that lights the LEDs as the light emitting elements.

FIG. 2 illustrates a circuit example of a conventional microphone device 1 that lights an LED using a power supply to be supplied to an audio output circuit of a microphone.

The reference sign 5 in FIG. 2 illustrates a condenser microphone unit. An output of the condenser microphone unit 5 is subjected to impedance conversion, and is output from an output terminal (output connector) 8 as a balanced output signal by an audio signal output circuit 6.

This output terminal 8 is a three-pin type connector including a first pin P1 for grounding, a second pin P2 used as a hot side of a signal, and a third pin P3 used as a cold side of the signal. A signal from the microphone 1 is sent to a microphone amplifier unit such as a mixer (not illustrated) through a microphone cable (balanced shield cable (not illustrated)) connected to the output terminal 8.

Further, a direct current equally divided through the second pin P2 and the third pin P3 of the output terminal 8 is sent from a phantom power feed circuit included in the microphone amplifier unit side such as the mixer to the microphone 1 side. Then, a light emitting drive current is supplied to the above-described audio signal output circuit 6 including the impedance conversion circuit, and a display circuit 9 including an LED (D1) as the light emitting element, using a direct current drive voltage generated in a power supply circuit 7 arranged at the microphone 1 side.

Note that configurations of the audio signal output circuit 6 including the impedance conversion circuit and the power supply circuit 7 illustrated in FIG. 2 are the same as an embodiment according to the present invention illustrated in FIG. 3 described below. Therefore, in FIGS. 2 and 3, a portion serving the same function is denoted with the same reference sign, and details thereof will be described below based on FIG. 3.

In the configuration illustrated in FIG. 2, the display circuit 9 that performs lighting and non-lighting of the LED (D1) as the light emitting element mounted on the microphone 1 by remote control, using the direct current power supply by the power supply circuit 7, is included.

That is, an anode of the LED (D1) is connected to the display circuit 9 through a resistance R7 that receives a drive current from the power supply circuit 7 and a constant current diode CR2, and a cathode of the LED (D1) is connected to a ground. Then, a condenser C7 is inserted between a connection point of the resistance R7 and the constant current diode CR2, and the ground, and an N-type MOS-field effect transistor (Q5) is connected in parallel to the LED (D1). Then, a gate of the MOS-field effect transistor (Q5) is connected to a signal line connector 10.

A remote control operation unit 11 that performs a blinking operation of the LED (D1) is connected to the signal line connector 10 at the microphone device 1 side through a connector 12. A resistance R9 and a manual switch S1 are connected in series and arranged between a direct current operation power supply Vcc and the ground in the remote control operation unit 11. Then, a connection point of the resistance R9 and the manual switch S1 is connected to a Schmitt trigger circuit ST that functions as a waveform forming circuit. An output of the Schmitt trigger circuit ST is supplied to an inverter circuit IN, and an output of the inverter circuit IN is supplied to a gate of the MOS-field effect transistor (Q5) at the microphone device 1 side through the connectors 12 and 10.

According to the circuit configuration illustrated in FIG. 2, the manual switch S1 included in the remote control operation unit 11 is operated to ON, so that a voltage level supplied to the Schmitt trigger circuit ST is made to the ground (L level). Accordingly, an output potential of the Schmitt trigger circuit ST becomes an "H" level that is close to the direct current operation power supply Vcc.

The output of the Schmitt trigger circuit ST is inverted by the inverter circuit IN. Therefore, a potential supplied to the gate of the MOS-field effect transistor (Q5) at the microphone device 1 side is made to the "L" level, and the MOS-field effect transistor (Q5) becomes an OFF state.

Therefore, the current from the power supply circuit 7 included in the microphone 1 is supplied to the LED (D1) connected in parallel to the MOS-field effect transistor (Q5), and the LED (D1) is lighted.

Note that, when the manual switch S1 included in the remote control operation unit 11 is operated to OFF, functions of the above-described "H" level and "L" level are inverted, and the MOS-field effect transistor (Q5) is made to an ON state. As a result, the current flowing in the LED (D1) is decreased, and the LED (D1) is made to a lights-out state.

The microphone device which includes the power supply circuit 7 that provides the drive current to the audio signal output circuit 6 including the impedance conversion circuit of the condenser microphone, and which lights the LED as the light emitting element using the current from the power supply circuit 7, as illustrated in FIG. 2, is disclosed in Japanese Patent No. 4528465 (hereinafter, called Patent Document 1).

By the way, the microphone device disclosed in Patent Document 1 is configured to provide the drive current from the power supply circuit 7 to the audio signal output circuit 6 including the impedance conversion circuit and the display circuit 9 including the LED. That is, the audio signal output circuit 6 and the display circuit 9 are connected in parallel to the power supply circuit 7. Therefore, when an operation to blink the LED (D1) is performed, a power supply voltage of the power supply circuit 7 fluctuates, and a drain voltage of the field effect transistor (Q1) that configures the impedance conversion circuit and an operation voltage of the audio signal output circuit 6, for example, also fluctuate in association with the fluctuation of the power supply voltage of the power supply circuit 7, and a problem that the fluctuation of the operation voltage of the audio signal output circuit is immediately superimposed on an audio signal as noises occurs.

To suppress the occurrence of the noises, in the circuit configuration illustrated in FIG. 2, the resistance R7 and the condenser C7 are arranged in the display circuit 9, and means to make the fluctuation of the power supply voltage associated with blinking of the LED (D1) moderate is applied. In this case, by setting a value of the resistance R7 to be large, the occurrence of the noises can be further suppressed. However, a voltage value applied to the LED is decreased, and thus it becomes difficult to light a plurality of LEDs at the same time to enhance visibility of the LEDs.

SUMMARY OF THE INVENTION

The present invention has been made in view of the above-described technical problems, and an objective is to provide a microphone device including light emitting elements that can suppress occurrence of noises based on lighting and non-lighting operations of LEDs as the light emitting elements, and can improve the visibility of light emitting elements by controlling lighting of the plurality of light emitting elements at the same time.

A microphone device including light emitting elements according to the present invention that has been made to solve the above problems includes a condenser microphone unit, an audio output circuit configured to balanced-output, through a balanced transmission line, an audio signal output from the condenser microphone unit, a balanced output terminal including a hot terminal, a cold terminal, and a ground terminal connected to the balanced transmission line, a power supply circuit configured to supply a phantom power supply to the audio output circuit from the balanced output terminal through the balanced transmission line, a manual switch, and a display circuit including the light emitting elements that perform lighting and non-lighting according to an operation of the manual switch, wherein the display circuit includes constant current elements that generate a constant current through the balanced transmission line, a constant voltage element that is connected to the constant current elements and generates a constant voltage, and the light emitting elements connected to the constant current elements, and to which the constant voltage by the constant voltage element is applied.

In this case, a configuration in which the constant current elements are favorably constant current diodes with one ends respectively connected to the hot terminal and the cold terminal, and the other ends commonly connected, and the light emitting elements and the constant voltage element are connected to a side of the commonly connected ends can be employed.

Meanwhile, a configuration in which the display circuit includes a transistor that is ON/OFF driven according to an operation of the manual switch, and the light emitting elements are connected to the transistor in series is employed.

And the other ends of the commonly connected end of the constant current elements and the constant voltage element are both connected to the ground terminal. Further, the constant voltage element is connected in parallel to the series circuit of the transistor and the light emitting elements.

Then, favorably, as the light emitting elements, a plurality of LEDs connected in series is used.

According to the microphone device including light emitting elements having the above-described configuration, a current is drawn through the balanced transmission line using the constant current diode, and a stabilized operation voltage can be obtained with the constant voltage element (constant voltage diode). Further, the LEDs in the display circuit are driven and lighted using the stabilized voltage.

Therefore, even if a switching operation of lighting and non-lighting of the LEDs is performed, the switching operation does not influence the power supply circuit that drives a signal output circuit including an impedance conversion circuit, and occurrence of noises in the signal output circuit can be prevented.

Further, a direct current from the phantom power supply can be supplied to the LEDs through the constant current elements. Therefore, a microphone device that can secure sufficient voltage and current to emit the plurality of LEDs connected in series and can further improve visibility of the LEDs can be provided.

DESCRIPTION OF THE PREFERRED EMBODIMENTS

Hereinafter, a microphone device including light emitting elements according to the present invention will be described based on an embodiment illustrated in FIG. 3.

Figure 1:
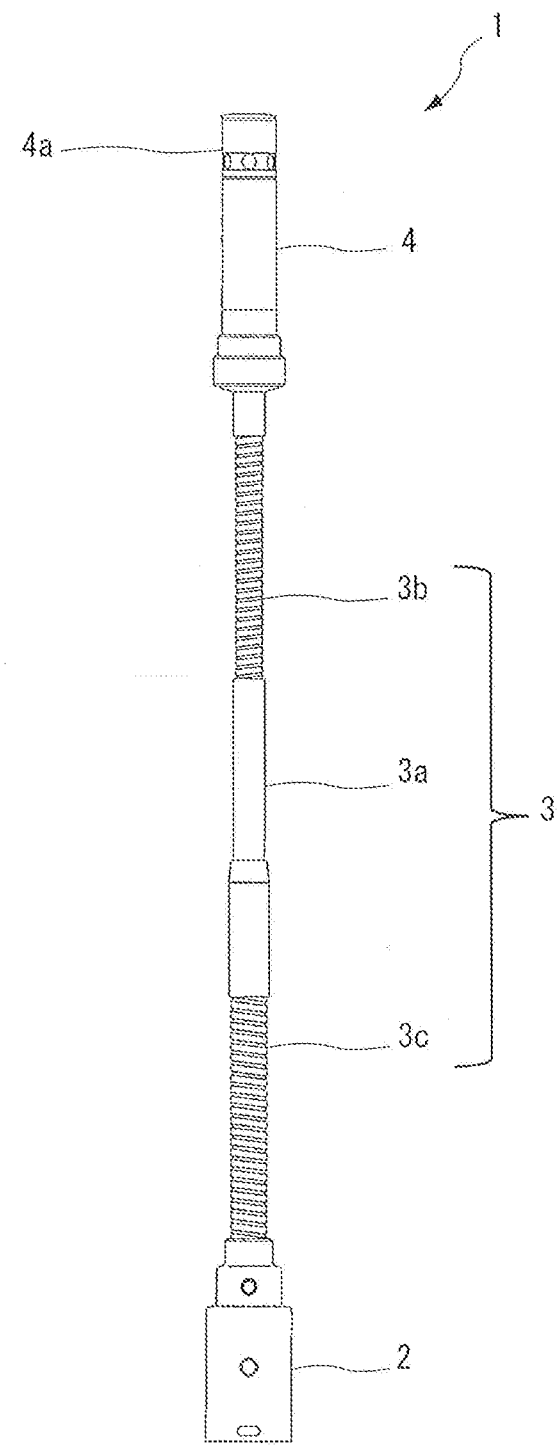
FIG. 1 is an appearance diagram illustrating an example of a gooseneck-type microphone including light emitting elements.
Figure 3:
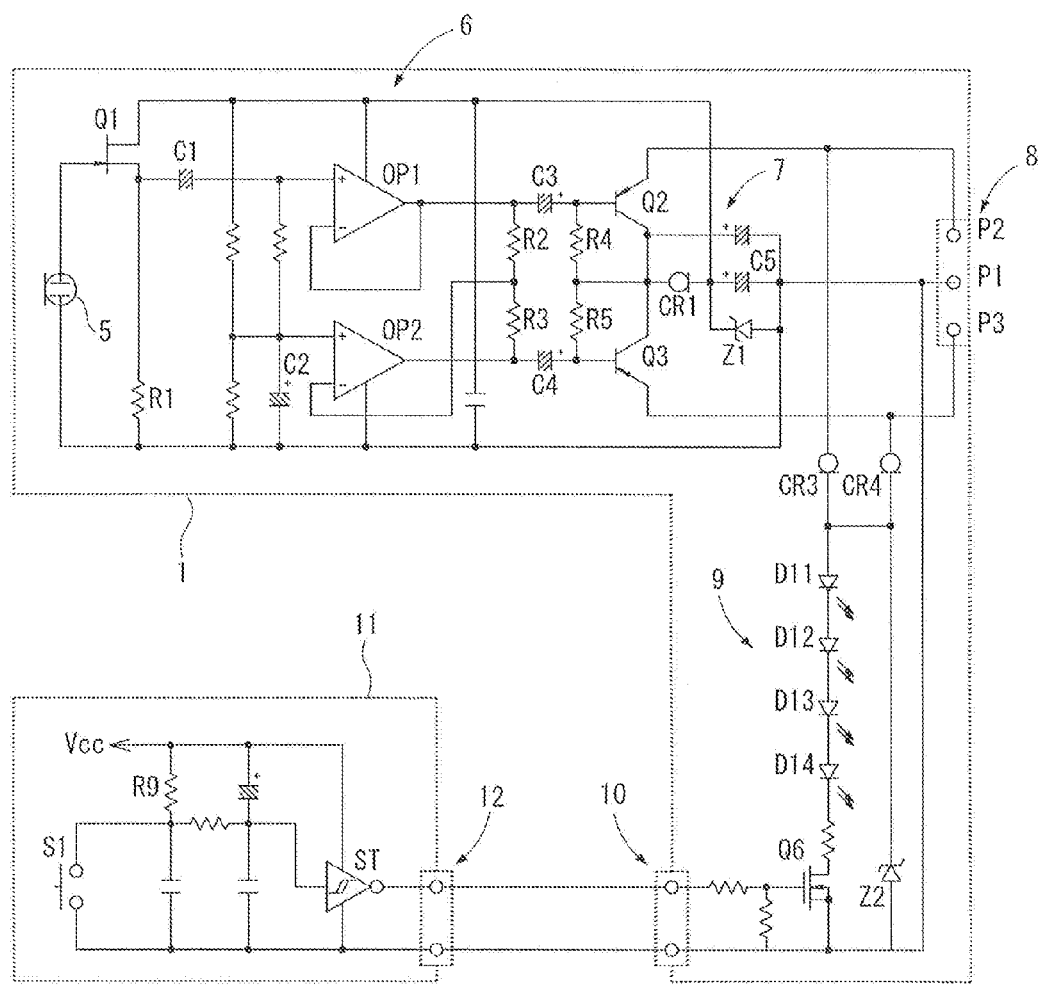
FIG. 3 is a circuit configuration diagram illustrating an embodiment of a microphone device according to the present invention.

A microphone device 1 illustrated in FIG. 3 configures a gooseneck-type microphone, which is similar to the example illustrated in FIG. 1. A condenser microphone unit 5 mounted in a microphone case 4 configures an electret condenser microphone unit that includes an electret layer in either a diaphragm or a fixed electrode, which face each other.

Then, the one fixed electrode is connected to a gate of a field effect transistor (Q1) that functions as an impedance converter, and the other diaphragm is connected to a ground of the microphone device 1. Further, a direct current operation voltage is supplied from a power supply circuit 7 described below to a drain of the field effect transistor (Q1), and a source resistance R1 is connected to a source of the field effect transistor (Q1), so that the field effect transistor (Q1) configures a source follower circuit.

A coupling condenser C1 is connected to the source of the field effect transistor (Q1), and a signal subjected to impedance conversion is drawn from the condenser microphone unit 5. This signal is supplied to a non-inverting input terminal of a first operational amplifier OP1. An input resistance R2 of a second operational amplifier OP2 is connected to an output terminal of the first operational amplifier OP1, and the other end of the input resistance R2 is connected to an inverting input terminal of the second operational amplifier OP2.

Then, a non-inverting input terminal of the second operational amplifier OP2 is connected to the ground through a condenser C2, and a feedback resistance R3 is connected between the inverting input terminal and an output terminal of the second operational amplifier OP2.

In addition, values of the input resistance R2 and the feedback resistance R3 are set equal, so that the second operational amplifier OP2 configures an inverting amplifier with a voltage amplification factor of −1.

Therefore, an output of the first operational amplifier OP1 and an output of the second operational amplifier OP2 are brought in a relationship in which signals obtained by the condenser microphone unit 5 are in mutually opposite phases (a state of balanced output). The balanced-output signals are respectively supplied to bases of transistors Q2 and Q3 through coupling condensers C3 and C4.

The transistor Q2 configures a first emitter follower circuit including a bias setting resistance R4, and an output of the first emitter follower circuit is supplied to a second pin P2 of an output terminal (output connector) 8 as a hot-side output of the signal. Further, the transistor Q3 configures a second emitter follower circuit including a bias setting resistance R5, and an output of the second emitter follower circuit is supplied to a third pin P3 of the output terminal (output connector) 8 as a cold-side output of the signal.

Further, a direct current is equally divided to the hot side and the cold side and sent to the microphone device 1 side through the second pin P2 and the third pin P3 of the output connector 8 that balanced-outputs the signal from a phantom power feed circuit included in a microphone amplifier unit side such as a mixer (not illustrated) connected to the microphone device 1.

The direct current from the phantom power feed circuit is brought to a commonly connected collector of the transistors Q2 and Q3 that configure the first and second emitter follower circuits. Then, an anode of a constant current diode CR1 is connected to the commonly connected collector. Further, a constant voltage element Z1 and a condenser C5 are connected in parallel between a cathode and the ground of the constant current diode CR1.

Accordingly, a power supply circuit (constant voltage circuit) 7 is configured at the cathode side of the constant current diode CR1. A drive voltage is supplied from the power supply circuit 7 to the field effect transistor (Q1) and the first and second operational amplifiers OP1 and OP2.

Meanwhile, the microphone device 1 is configured to obtain the drive current to be provided to a display circuit 9 through the second pin P2 and the third pin P3 in the output terminal (output connector) 8 that is a balanced transmission line of signals, from the phantom power supply.

That is, anodes of constant current diodes CR3 and CR4 as constant current elements are respectively connected to the second pin P2 and the third pin P3, and respective cathodes are commonly connected. Further, a constant voltage element (Zener diode) Z2 is connected between the commonly connected cathodes of the constant current diodes CR3 and CR4 and the ground.

Then, a series circuit of four LEDs (D11 to D14) as light emitting elements and an N-type MOS-field effect transistor (Q6) is inserted in parallel to the constant voltage element Z2. Therefore, a constant voltage by the constant voltage element Z2 is applied to the LEDs (D11 to D14) connected in series.

Further, a gate of the MOS-field effect transistor (Q6) is connected to a signal line connector 10, and a remote control operation unit 11 that can perform a blinking operation of the LEDs (D11 to D14) is connected to the signal line connector 10 through a connector 12.

Figure 2:
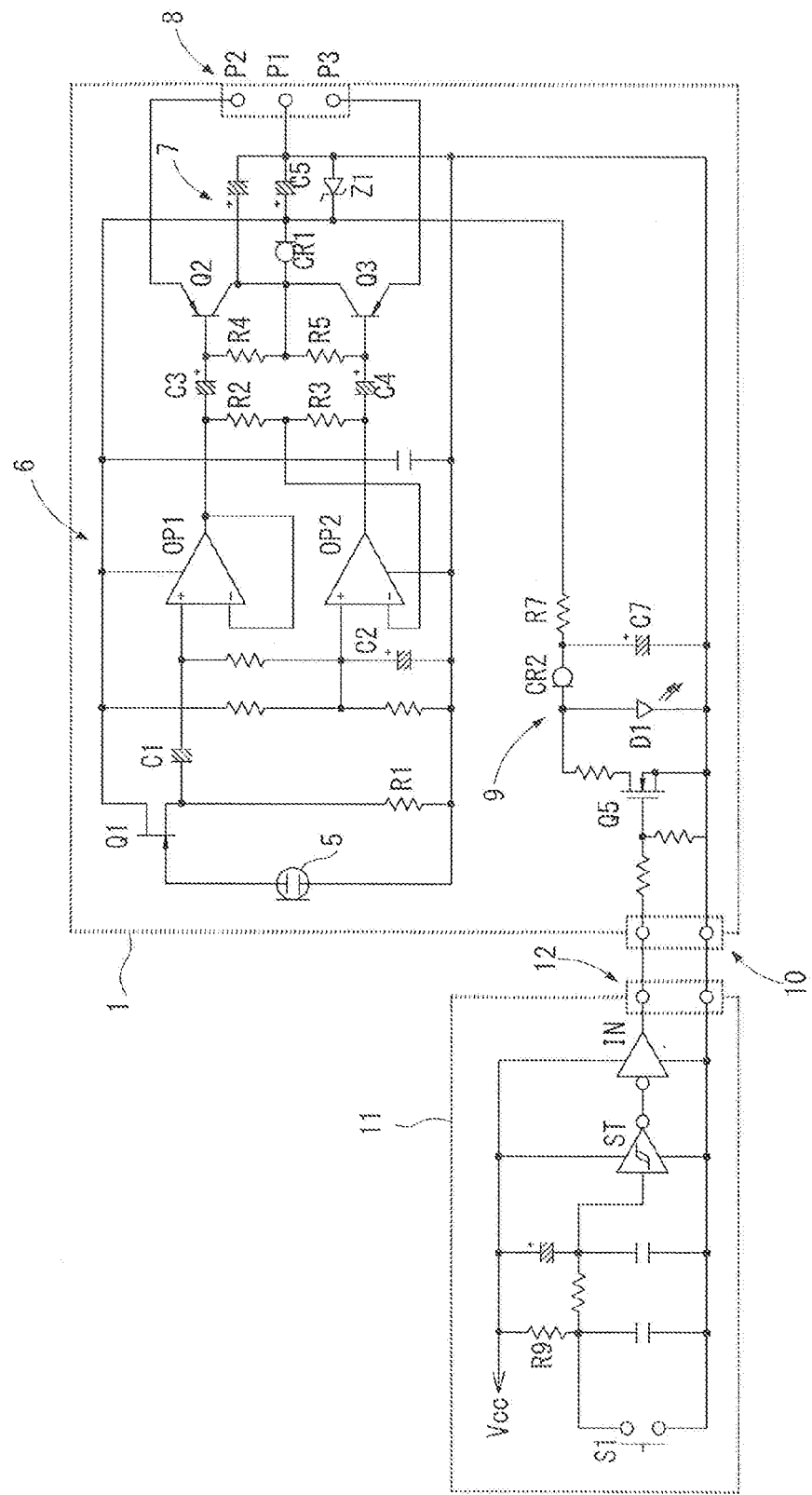
FIG. 2 is a circuit configuration diagram illustrating an example of a conventional microphone device including a light emitting element.

The remote control operation unit 11 illustrated in FIG. 3 has the same basic configuration as the above-described remote control operation unit 11 illustrated in FIG. 2. However, the inverter circuit IN in the remote control operation unit 11 illustrated in FIG. 2 is deleted from the remote control operation unit 11 illustrated in FIG. 3.

Therefore, when a manual switch S1 included in the remote control operation unit 11 is operated to ON, a voltage level to be supplied to a Schmitt trigger circuit ST is made to the ground (L level), and an output potential of the Schmitt trigger circuit ST becomes an "H" level close to a direct current operation power supply Vcc that is an operation power supply of the remote control operation unit 11.

The output in the "H" level is supplied to the gate of the N-type MOS-field effect transistor (Q6) in the display circuit 9. Therefore, the MOS-field effect transistor (Q6) becomes an ON state, and the LEDs (D11 to D14) are lighted.

Note that, when the manual switch S1 included in the remote control operation unit 11 is operated to OFF, the above-described "H"-level and "L"-level functions are inverted, and the MOS-field effect transistor (Q6) is made to an OFF state. As a result, the LEDs (D11 to D14) become a lights-out state.

The above-described microphone device is configured to draw the current from the phantom power supply with the constant current element connected to the balanced transmission line, and drives and lights the LEDs as the light emitting elements with the operation voltage stabilized by the constant voltage element.

Therefore, influence of voltage fluctuation on the power supply circuit 7 with the lighting and non-lighting operations of the LEDs can be avoided. Accordingly, the problem that noises are superimposed on an audio signal output circuit 6 operated by the power supply circuit 7 can be resolved.

Further, since the configuration to draw the current through the balanced transmission line is employed, a microphone device that can secure the sufficient voltage and current to emit the plurality of LEDs connected in series and can improve visibility of the LEDs can be provided. Therefore, the functions and effects as described in SUMMARY OF THE INVENTION can be obtained.

Note that the above-described microphone device is configured to remotely operate the lighting and non-lighting of the LEDs as the light emitting elements by the remote control operation unit. However, the microphone device may be configured to remotely operate the lighting and non-lighting of the LEDs according to ON/OFF operations of an audio output switch included in the microphone device, for example.

Further, in the embodiment, an example in which the LEDs as the light emitting elements are mounted in the gooseneck-type microphone has been described. However, it is apparent that the LEDs as the light emitting elements can be similarly employed in microphone devices other than the gooseneck-type microphone.

Further, the number of the LEDs (D11 to D14) is not limited to four, and an appropriate number of LEDs may be connected.

What is claimed is:

1. A microphone device including light emitting elements, comprising:
   a condenser microphone unit;
   an audio output circuit configured to balanced-output, through a balanced transmission line, an audio signal output from the condenser microphone unit;
   a balanced output terminal including a hot terminal, a cold terminal, and a ground terminal connected to the balanced transmission line;
   a power supply circuit configured to supply a phantom power supply to the audio output circuit from the balanced output terminal through the balanced transmission line;
   a manual switch; and
   a display circuit including the light emitting elements that perform lighting and non-lighting according to an operation of the manual switch, wherein
   the display circuit includes
      constant current elements that generate a constant current through the balanced transmission line,
      a constant voltage element that is connected to the constant current elements and generates a constant voltage, and
      the light emitting elements connected to the constant current elements, and to which the constant voltage by the constant voltage element is applied.

2. The microphone device including light emitting elements according to claim 1, wherein
   the constant current elements are constant current diodes with one ends respectively connected to the hot terminal and the cold terminal, and the other ends commonly connected, and the light emitting elements and the constant voltage element are connected in parallel to a side of the commonly connected ends.

3. The microphone device including light emitting elements according to claim 1, wherein
   the display circuit includes a transistor that is ON/OFF driven according to an operation of the manual switch, and the light emitting elements are connected to the transistor in series.

4. The microphone device including light emitting elements according to claim 2, wherein
   the other ends of the commonly connected end of the constant current elements and the constant voltage element are both connected to the ground terminal.

5. The microphone device including light emitting elements according to claim 3, wherein
   the constant voltage element is connected in parallel to the series circuit of the transistor and the light emitting elements.

6. The microphone device including light emitting elements according to claim 2, wherein
   the light emitting elements are a plurality of LEDs connected in series.

* * * * *